United States Patent
Tonogai

(10) Patent No.: US 9,596,592 B2
(45) Date of Patent: Mar. 14, 2017

(54) CONTROLLER AND METHOD OF CONTROLLING MULTIPLE IDENTITIES OF A MOBILE DEVICE

(71) Applicant: SHORETEL, INC., Sunnyvale, CA (US)

(72) Inventor: Dale C. Tonogai, Los Altos, CA (US)

(73) Assignee: Shoretel, Inc., Sunnyvale, CA (US)

( * ) Notice: Subject to any disclaimer, the term of this patent is extended or adjusted under 35 U.S.C. 154(b) by 0 days.

(21) Appl. No.: 14/947,614

(22) Filed: Nov. 20, 2015

(65) Prior Publication Data

US 2016/0080935 A1    Mar. 17, 2016

Related U.S. Application Data

(63) Continuation of application No. 14/174,960, filed on Feb. 7, 2014, now Pat. No. 9,215,683, which is a
(Continued)

(51) Int. Cl.
*H04M 1/66* (2006.01)
*H04W 8/18* (2009.01)
(Continued)

(52) U.S. Cl.
CPC ....... *H04W 8/183* (2013.01); *H04M 3/42229* (2013.01); *H04M 3/42314* (2013.01); *H04M 3/533* (2013.01); *H04W 4/12* (2013.01); *H04W 4/16* (2013.01); *H04W 8/20* (2013.01); *H04W 60/005* (2013.01); *H04M 2207/18* (2013.01); *H04M 2207/20* (2013.01);
(Continued)

(58) Field of Classification Search
USPC ....................................... 455/411
See application file for complete search history.

(56) References Cited

U.S. PATENT DOCUMENTS 5,307,400 A    4/1994    Sawyer et al.
5,490,201 A    2/1996    Moberg et al.
(Continued)

FOREIGN PATENT DOCUMENTS

WO    2005084128 A2    9/2005
WO    2006027772 A2    3/2006
(Continued)

OTHER PUBLICATIONS

International Search Report, Applicant: Agito Networks, Inc.; International Application No. PCT/US2009040515, International Filing Date Apr. 14, 2009; Authorized Officer: Blaine R. Copenheaver; Date of Completion: Jun. 4, 2009; 2 pp.
(Continued)

*Primary Examiner* — Joel Ajayi
(74) *Attorney, Agent, or Firm* — Tarolli, Sundheim, Covell & Tummino LLP

(57) ABSTRACT

A method can include detecting at a mobile device controller a communication from a sender to a recipient. One of the sender or the recipient is a mobile device that is registered to operate with a first identity in a mobile network of a service provider and is registered to operate with a second identity in a private network. The method can include determining which identity of the mobile device to employ in response to detecting the communication based on information associated with the communication. The communication can be directed to the recipient using the determined identity.

19 Claims, 5 Drawing Sheets

Related U.S. Application Data continuation-in-part of application No. 12/778,648, filed on May 12, 2010, now Pat. No. 8,649,819.

(51) Int. Cl.

| | |
|---|---|
| *H04W 60/00* | (2009.01) |
| *H04W 4/12* | (2009.01) |
| *H04W 8/20* | (2009.01) |
| *H04M 3/42* | (2006.01) |
| *H04W 4/16* | (2009.01) |
| *H04M 3/533* | (2006.01) |
| *H04W 12/02* | (2009.01) |
| *H04W 80/04* | (2009.01) |
| *H04W 12/08* | (2009.01) |

(52) U.S. Cl.
CPC ............ *H04W 12/02* (2013.01); *H04W 12/08* (2013.01); *H04W 80/04* (2013.01)

(56) References Cited

U.S. PATENT DOCUMENTS

| | | | |
|---|---|---|---|
| 5,913,166 | A | 6/1999 | Buttitta et al. |
| 6,058,311 | A | 5/2000 | Tsukagoshi |
| 6,125,283 | A | 9/2000 | Kolev et al. |
| 6,278,707 | B1 | 8/2001 | MacMillan et al. |
| 6,347,085 | B2 | 2/2002 | Kelly |
| 6,381,456 | B1 | 4/2002 | Ko |
| 6,725,044 | B2 | 4/2004 | Verma et al. |
| 6,735,621 | B1 | 5/2004 | Yoakum et al. |
| 6,741,695 | B1 | 5/2004 | McConnell et al. |
| 6,957,065 | B1 | 10/2005 | Lindholm |
| 6,973,308 | B1 | 12/2005 | Smith |
| 7,027,433 | B2 | 4/2006 | Tuchino et al. |
| 7,079,511 | B2 | 7/2006 | Abroi et al. |
| 7,177,636 | B2 | 2/2007 | Oda et al. |
| 7,379,436 | B2 | 5/2008 | Jiang |
| 7,395,085 | B1 | 7/2008 | Mauer et al. |
| 7,426,265 | B2 | 9/2008 | Chen et al. |
| 7,593,365 | B1 | 9/2009 | Delker et al. |
| 7,664,495 | B1 | 2/2010 | Bonner et al. |
| 8,270,346 | B2 | 9/2012 | Olson |
| 8,412,241 | B2 | 4/2013 | Silver et al. |
| 8,589,529 | B2 | 11/2013 | Siegel et al. |
| 2002/0094811 | A1 | 7/2002 | Bright et al. |
| 2002/0101859 | A1 | 8/2002 | Maclean |
| 2002/0147008 | A1 | 10/2002 | Kallio |
| 2002/0187780 | A1 | 12/2002 | Souissi |
| 2005/0009504 | A1 | 1/2005 | Kyung et al. |
| 2006/0030357 | A1 | 2/2006 | McConnell et al. |
| 2006/0058032 | A1 | 3/2006 | Pearce et al. |
| 2006/0079236 | A1 | 4/2006 | Del Pino et al. |
| 2006/0105770 | A1 | 5/2006 | Jagadeesan et al. |
| 2006/0121891 | A1 | 6/2006 | Jagadeesan et al. |
| 2006/0291483 | A1 | 12/2006 | Sela |
| 2007/0037578 | A1 | 2/2007 | Besterman |
| 2007/0121596 | A1 | 5/2007 | Kurapati et al. |
| 2007/0206569 | A1 | 9/2007 | Silver et al. |
| 2007/0248079 | A1 | 10/2007 | Jayaram et al. |
| 2007/0254648 | A1 | 11/2007 | Zhang et al. |
| 2007/0265003 | A1 | 11/2007 | Kezys et al. |
| 2007/0291733 | A1 | 12/2007 | Doran et al. |
| 2008/0090570 | A1 | 4/2008 | Deshpande et al. |
| 2008/0144637 | A1 | 6/2008 | Sylvian et al. |
| 2008/0205386 | A1 | 8/2008 | Purnadi et al. |
| 2008/0207257 | A1 | 8/2008 | Lim et al. |
| 2008/0254797 | A1 | 10/2008 | Achtari et al. |
| 2009/0036128 | A1 | 2/2009 | Raguparan et al. |
| 2010/0210304 | A1 | 8/2010 | Huslak |

FOREIGN PATENT DOCUMENTS

| | | |
|---|---|---|
| WO | 2006036641 A1 | 4/2006 |
| WO | 2007120921 A2 | 10/2007 |
| WO | 2008015660 A1 | 2/2008 |
| WO | 2008027686 A2 | 3/2008 |

OTHER PUBLICATIONS

Written Opinion of the International Search Report, Applicant: Agito Networks, Inc.; International Application No. PCT/US2009040515, International Filing Date Apr. 14, 2009; Authorized Officer: Blaine R. Copenheaver; Date of Completion: Jun. 4, 2009; 8 pp.

CONTROLLER AND METHOD OF CONTROLLING MULTIPLE IDENTITIES OF A MOBILE DEVICE

CROSS-REFERENCE TO RELATED APPLICATION

This application is a continuation of U.S. patent application Ser. No. 14/174,960, filed Feb. 7, 2014, and entitled CONTROLLER AND METHOD OF CONTROLLING MULTIPLE IDENTITIES OF A MOBILE DEVICE, which is continuation-in-part of U.S. patent application Ser. No. 12/778,648 (U.S. Pat. No. 8,649,819), filed May 12, 2010, and entitled MOBILE PHONE INTEGRATION WITH A PRIVATE BRANCH EXCHANGE IN A DISTRIBUTED TELEPHONY SYSTEM, the entire contents of each of the above-identified application is incorporated herein by reference.

TECHNICAL FIELD

This disclosure relates mobile device controller and method of controlling use of multiple identities for a mobile device.

BACKGROUND

Bring your own device (BYOD) refers to the policy of permitting employees to bring personally owned mobile devices (laptops, tablets, and smart phones) to their workplace, and to use those devices to access privileged company information and applications. In the context of mobile devices, there can be additional issues related to distinguishing between personal versus business usage.

SUMMARY

This disclosure relates mobile device controller and method of controlling use of multiple identities for a mobile device In one example, a method can include detecting at a mobile device controller a communication from a sender to a recipient. One of the sender or the recipient is a mobile device that is registered to operate with a first identity in a mobile network of a service provider and is registered to operate with a second identity in a private network. The method can include determining which identity of the mobile device to employ in response to detecting the communication based on information associated with the communication. The communication can be directed to the recipient using the determined identity.

In another example, one or more non-transitory computer readable media can include executable instructions. The instructions can include a communication detector configured to detect a communications to or from a mobile device operating in a mobile network, the mobile device also being configured to operate in a private network. A mobile identity selector can be configured to determine an identity for the mobile device from a plurality of different identities of the mobile device to be associated with the detected communication. Logic can be configured to direct the detected communication to a recipient based on the determined identity that is associated with the detected communication to enable the detected communication to be received by the recipient for the determined identity.

In yet another example, a system can include a private network, a mobile network and a mobile device controller. The private network can include a private branch exchange system. A plurality of communication devices can be registered to operate in the private network, each according to respective enterprise identity in the private network. The plurality of communication devices include a given mobile device. The mobile network can provide wireless service to a plurality of mobile devices registered for operation in the mobile network, each according to a respective personal identity in the mobile network. The plurality of mobile devices can include the given mobile device. The mobile device controller is configured to selectively employ one of the enterprise identity or the personal identity of the given mobile device for an inbound or outbound communication with respect to the given device based on information associated with the communication and configured to direct the inbound or outbound communication with the selected identity

DETAILED DESCRIPTION

This disclosure relates to a mobile device controller, computer readable media and method that can be implemented to control multiple distinct identities of a mobile device (e.g., mobile telephone). Each identity, for example, can correspond to a phone number that is linked to a distinct persona or characteristic of a given user or device that is utilized by the given user. Each identity can be associated with or registered for communication in a different network, or more than one of the device's identities can be registered to operate distinctly within a single given network. In some examples, the device can be a BYOD (bring your own device) mobile device, such as a mobile (e.g., cellular) telephone that is registered to operate in one or more communication networks.

As an example, a mobile device controller can be implemented separately from a mobile device and a private network in which the mobile device can be registered for operation (e.g., call control and routing via a private branch exchange (PBX)). In some examples, the mobile device controller can be implemented in the mobile network in which the mobile device is configured for operation. By implementing such mobile device controller apart from the private network and the mobile device, a seamless approach can be implemented to separate the multiple identities of the mobile device such as by maintaining distinct business and personal identities for different communications. The mobile device controller can maintain the multiple identities across different forms of communication including telephone calls, short message service (SMS), personal and business voice mail, and the like.

The mobile device controller can provide an aggregation point in the communication system for the different identities that can be utilized as an interface for providing communications to and from the mobile device. For example, the mobile device controller can be configured to spit outbound communications from the mobile device to different communication networks depending upon the identity that is determined for the outbound communication. The mobile device controller likewise can consolidate (e.g., merge) inbound communications to the mobile device from multiple sources (e.g., from a mobile network and from a private network), which inbound communications can have different identities. The mobile device controller can direct communications to and from the mobile device in a manner that is seamless to the user of the mobile device, such that no additional application is required to be resident on the mobile device in order to maintain the multiple identities for such communications.

Figure 1:
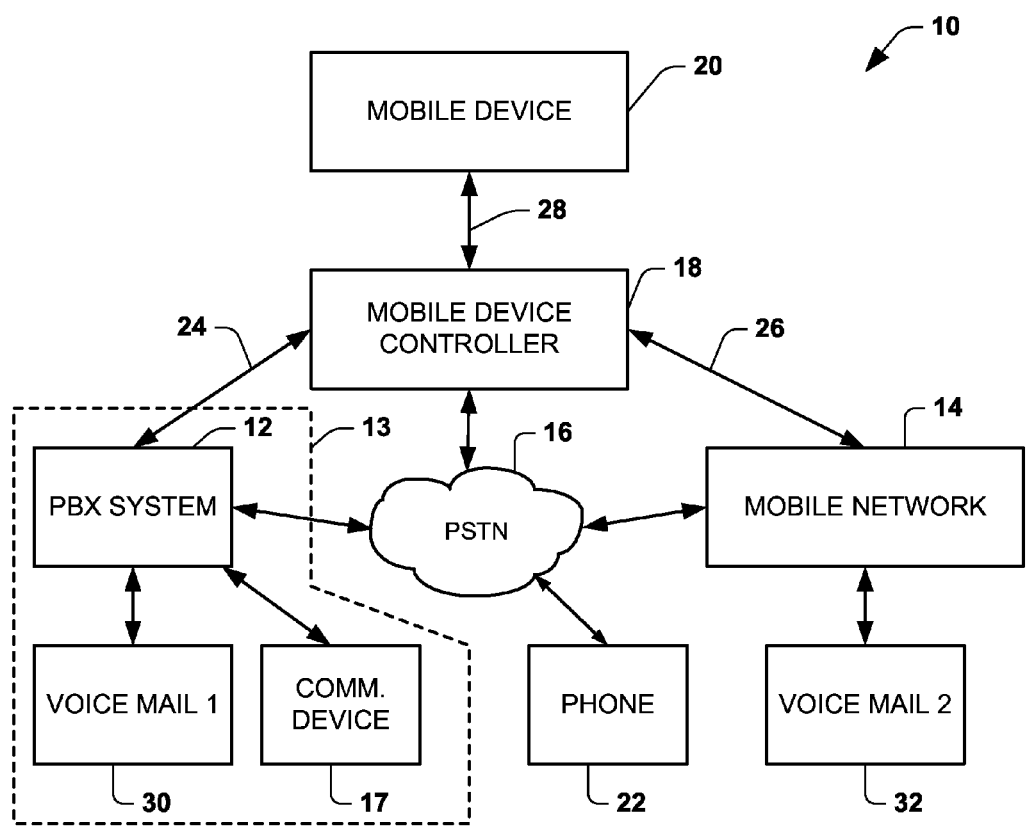
FIG. 1 depicts an example of a communication system configured to control multiple identities for a mobile device.

FIG. 1 depicts an example of a communication system 10 such as can be implemented as part of a distributed telephony system. The system 10 includes a PBX system 12 and a first network 14, each of which can be coupled to a public switch telephone network (PSTN) 16. The PBX 12 can be configured to perform call control and routing functions for client devices operating in another given network, demonstrated by dashed line 13. In some examples disclosed herein, the given network 13 can be a private network. Each of the PBX 12 of the network 13 and the mobile network 14 is in communication with a mobile device controller 18. The mobile device controller 18 resides between a mobile device 20 and each of the possible sources of communication for the mobile device, namely the PBX system 12, PSTN 16 and the mobile network 14. The mobile device 20 can have one or more identities (also referred to as personas), which can pertain to one of the networks 13, 16 and/or 14, for example. While many examples are disclosed herein refer to the identities of the mobile device 20 as corresponding to a business identity associated with the PBX system 12 or a personal identity associated with the mobile network 14, it is to be understood that a given mobile device 20 can include any number of two or more identities that may be in addition to or different from personal and business personas.

Additionally, two or more different identities can be associated with (e.g., registered) for operation in one or more of the networks 13 and 14. For example, the mobile device 20 can be registered to operate with more than one distinct identity in the first network (e.g., a mobile network), such as according to multiple, active subscriber identifier modules implemented in the mobile device registered concurrently in such network. As yet another example, the mobile device 20 can include multiple active subscriber identifier modules that are registered for concurrent operation in different mobile networks.

The PBX 12 can be configured to perform call control and routing functions for client devices operating in the private network 13. The PBX 12 provides a communications exchange that services the private network 13 (e.g., a business that may include one or more offices). This is in contrast to a common carrier (e.g., telephone service provider) that operates for many businesses or for the general public, such as the mobile network 14. The PBX 12 can include a hardware (e.g., switches, logic lines, routers, conferencing systems, and other controls) and software configured to couple to the PSTN 16 or another network, such as the Internet (not shown) for sending and receiving communications to and from the private network 13 as well as for routing, distributing and managing communications within the private network 13. The PBX 12 can be configured to implement packet switched calls, such as implementing voice over internet protocol (VoIP), circuit switched calls or a combination of packet and circuit switched communications.

As an example, an enterprise identity for the mobile device 20 can utilize any number of communication devices throughout the system 10 some of which can be connected to the PBX system 12 via physical or wireless communication links (e.g., a desk phone, IP phone, soft phone or the like), such as device 17. Thus when a communication is placed to the enterprise identity associated with the mobile device 20, the communication can be placed from within the PBX system 12, from the phone 22 via the PSTN 16 or it may be initiated from a communication device within the mobile network 14. The PBX system 12 can in turn implement call control and routing functions to route the communication to any one or more devices that have been assigned to the enterprise identity.

In some examples, the PBX system 12 can also be programmed for recording presence and history of presence as well as call history information that can be stored in response to inbound and outbound calls made to the business identity of the mobile device 20. Examples of other call control operations that can be implemented by the PBX system 12 include: (1) selectable phone lines; (2) remote answer from application; (3) remote answer selected media path (e.g., handset, speaker, headset, Bluetooth); (4) indicator of PBX phone number, extension number; (5) send incoming call to voicemail; (6) divert call; (7) answer additional call/return to calls on hold; (8) blind transfer; (9) consultative transfer; (10) intercom transfer; (11) transfer to mailbox; (12) intermediate conference; (13) consultative conference; (14) conference additional parties; (15) conference—create ad hoc conference call; (16) conference—join conference call; (17) intercom; (18) hold; (19) barge in; (20) bridged call appearance; (21) page; (22) park; (23) park and page; (24) pickup; (25) pickup night bell; (26) pickup/unpark; (27) record call; (28) record extension; (29) send digits over call; (30) silent monitor; (31) transfer whisper; (32) unpark; (33) whisper page; (34) Centrex Flash; (35) Ringdown—One-to-One Hotline; (36) Ringdown—One-to-Many Hotline (aka hoot 'n holler); (37) Handset Lift Ringdown; (38) Silent Coach; (39) Whisper Page Mute; (40) Answer Monitored Extension's Call; (41) Night Bell Pickup; (42) Overhead Paging; (43) User Group Paging; (44) Contact center login/logout; (45) music on hold; (46) call blocking; and (47) call camping. A person having ordinary skill in the art will recognize that the above-described list of PBX functionality is not exclusive and is provided only as an example of some PBX functionality. Such functionality of the PBX system 12 can be implemented by the mobile device 20 as well as one or more or other communication devices 17 that can be connected to the PBX and configured to operate in the private network 13. Information about how the mobile device (e.g., a mobile phone) can access the PBX functionality is disclosed in the above-incorporated U.S. Pat. No. 8,649,819.

As used herein, the private network 13 can refer to a communications network that is administered and/or operated by or on behalf of a private entity (e.g., a company, group of users, or other service provider). The private network 13 can be implemented locally at a single site. In other examples, the private network 13 can be a logical construct that is distributed across multiple sites but operated as a single enterprise, such as an enterprise unified communication system. As a further example, the components of the private network 13, including the PBX can be privately managed at one or more premises, they can be hosted by a third party, they can be virtualized (e.g., in a cloud computing environment) or any combination thereof.

The mobile device controller 18 can be implemented as hardware, software and/or a combination of hardware and software to control communications for each of multiple identities associated with one or more such mobile devices 20. For example, the mobile device controller 18 can operate as an aggregation interface for communications provided to and sent from the mobile device 20. In the example of FIG. 1, communications to and from the mobile device 20 can be transmitted from and each of the PBX system 12 or the mobile network 14 via signaling paths that include the mobile device controller 18.

In the example of FIG. 1, the mobile device controller 18 can be connected to the PBX system 12 and the mobile network 14 via corresponding communication links 24 and 26 and the mobile device 20 can be connected to the mobile device controller 18 via a communication link demonstrated at 28. Each of the communication links 24, 28 and 26 can include wireless transmission paths. In other examples, the links 24 and 26 can include other forms of communication, which may include one or more wireless and non-wireless communication paths. The mobile network 14 can correspond to a wireless service provider network that can provide a wireless voice network, a mobile data network or a combination of wireless voice and data. For example, the mobile network 14 can be implemented as a cellular communications network, such as according to one of the global system for mobile (GSM) standards (e.g., 2G, 3G or 4G), wireless metropolitan area networks (WirelessMAN) (e.g., WiMax), satellite telephone network or another wireless network provided by a mobile network operator.

The mobile device 20 is configured to operate in the mobile network 14 according to an identity of the mobile device that has been assigned to it by the mobile network 14. The identity can correspond to a telephone number that is assigned to a subscriber identity module (SIM) card to uniquely identify the mobile device 20 in the mobile network 14 or in another mobile network. For instance, the SIM card can include an authentication key that is stored in the mobile network (e.g., in an authentication center thereof) 14 and is used to authenticate the mobile device 20 on the mobile network. A corresponding telephone number identity can also be assigned to the mobile device 20, such as via a mapping to the SIM that has been assigned to the mobile device 20. In this way, the mobile network 14 can route communications (e.g., telephone calls, text messages or the like) to the mobile device according to the telephone number identity that has been assigned to the mobile device.

As disclosed herein, the mobile device 20 can have more than one identity or persona for communications, which can vary depending on the context of a given communication. Thus in addition to its identity in the mobile network 14, the mobile device 20 can have another identity associated with the PBX system 12. For example, the mobile device 20 can have an enterprise identity corresponding to a business persona. The enterprise identity further can have an enterprise telephone number that has been assigned to the mobile device 20 and/or to the user of such device. The telephone number can correspond to a regular telephone number, which can vary according to geographic location, or it can be identified via a short number dialing such as an extension in the private network.

The PBX system 12 is configured to route communication that has been initiated to the enterprise identity associated with the mobile device 20 to one or more devices, which can include an internet protocol (IP) phone, a softphone, or any other type of communication device that can be assigned to the enterprise identity for the mobile device 20. The PBX system 12 can also be configured to direct communications for the mobile device enterprise identity to the mobile device 20 itself via the mobile device controller 18.

The mobile device controller 18 is configured to manage automatically (e.g., without user intervention at the mobile device) the identity of the mobile device for both inbound and outbound communications. That is, in examples disclosed herein, the mobile device 20 does not include an application programmed to control its own identity for such communications, but instead the mobile device controller 18, which operates separately from the mobile device and the PBX system 12, manages its identity. For example, from the perspective of the user of the mobile device, all outbound telephone calls are initiated at the mobile device in the same manner (e.g., using the same call control interface) regardless of personal or business identity, all inbound telephone calls are answered at the mobile device in the same manner, all SMS messages are sent and received via the same mobile interface. Since the mobile device controller 18 automatically controls multiple identities, separate call controls are not required to enable the user to choose a desired identity for a communication. Thus, the mobile device can appear to afford multiple identities to the user in a seamless manner. In some examples, a manual override function may be available, however.

By way of example, a communication to the mobile device 20 that is sent to the PBX system 12 can correspond to a business communication intended for a business (e.g., enterprise) identity of the mobile device that is distinct from the identity exposed via the mobile network 14. As disclosed herein, such business communication may include an SMS, telephone call, email, a stored voicemail (e.g., message waiting indicator). In some examples, the PBX system 12 can implement an API (application interface) for accessing the functions and methods implemented by the mobile device controller 18. The API can be utilized for signaling an inbound communication is being provided to the mobile device 20 via the PBX system 12. The functionality programmed in the PBX system 12 can thus include accessing the mobile device controller 18 via the API. In other examples, the mobile device controller 18 can be configured to determine that each communication sent to the mobile device 20 via the mobile device controller has the business identity. The mobile device controller 18 can operate with any number of mobile devices 20, which may operate in the same or different mobile networks.

As another example, the PBX system 12 can be programmed to include a mobile device proxy for the mobile device 20 for handling outbound communications from the mobile device 20 to which the mobile device controller 18 assigns an enterprise identity. For instance, the mobile device controller 18 can direct an outbound communication from the mobile device to the proxy at the PBX system, which can receive and redirect the call to the recipient with the enterprise identity. The mobile device controller can inform the PBX system about the call via SIP or other form of signaling in-band or out-of-band signaling. The recipient can reside within the private network 13 (e.g., communication device 17) or be external to the private network such as a phone 22 in the PSTN or another device in the mobile network 14. In other examples, the mobile device controller 18 can modify the outbound communication from the mobile device to include the enterprise identity and route the communication directly to the recipient (without going through the PBX system 12), such as via the PSTN 16 or the mobile network 14.

The mobile device controller 18 can also manage inbound communications from the mobile network 14 intended for the mobile device 20 as well as send outgoing communications from the mobile device 20 to the mobile network for calls in which the mobile network identity for the mobile device is being implemented. For example, the mobile network 14 can include an API similar to as described with respect to the PBX system 12 for signaling and routing the inbound communication via the mobile device controller 18.

The mobile device controller 18 is further programmed to determine which identity of the mobile device to employ in response to detecting the inbound or outbound communication from the PBX system 12 or the mobile network 14. The mobile device controller 18 can determine the appropriate identity for the mobile device for a given communication based on information that is associated with such communication. For example, the information can be provided by in-band signaling that is provided along with the communication. Additionally or alternatively, the signaling can be provided by an out-of-band signaling mechanism, such as a data channel, SMS message or the like that is provided from the PBX system 12 or the mobile network 14 to the mobile device controller 18 (e.g., via communication links 24 or 26). As a further example, the PBX system 12 can communicate with the mobile device controller 18 via the session initiation protocol (SIP), such as by identifying call information in a diversion header.

As disclosed herein, the mobile device controller 18 can consolidate inbound calls from multiple sources which are demonstrated in the example of FIG. 1 as being the PBX system 12 or the mobile network 14 for sending to the mobile device 20. For the situation of outbound calls from the mobile device 20 the mobile device controller 18 further is configured to selectively direct the communication to different communication networks (e.g., the private network 13 or the mobile network 14) depending on the identity that has been determined for such communication.

In the example of FIG. 1, each of the PBX system 12 and mobile network 14 includes a respective voice mailbox 30 and 32. In other examples, the system can include a single voicemail box for each respective user in which messages for both each of a plurality of different identities can be stored. For instance, each of the messages stored in the single mailbox can be tagged differently (e.g., with identity information) to specify the identity that has been determined and assigned to each respective message. The PBX voice mailbox 30 can be utilized to store voicemail and other recorded communications for the enterprise identity associated with the mobile device 20. Similarly, the mobile network voicemail box can stored voice mail and other recorded communications for the personal identify of the mobile device. Thus, in this example, each of the voicemail boxes 30 and 32 are maintained separately by the respective networks 13 and 14.

As disclosed herein, the mobile device controller 18 can detect and control recipient identity for an inbound communication to the mobile device 20. For example, in response to detecting the inbound call is from the PBX system 12, the mobile device controller 18 can ascertain that the communication is intended for the enterprise identity for the mobile device 20. The mobile device controller can determine the enterprise identity based on signaling from the PBX system 12 (e.g., SIP, SMS, data or the like), which may be in-band or out-of-band signaling. The mobile device controller can be configured to tag the inbound communication with data specifying an identity of the mobile device 20 for such inbound communication. The tagging can be implemented by signaling via the link 28 that the inbound communication has an enterprise identity. This tagging can be performed for each inbound communication. Alternatively, in other examples, the tagging can be implemented only if the identity is determined to be different from a predetermined default identity (e.g., the personal identity in the mobile network 14).

If the user of the mobile device 20 answers the call, the mobile device controller 18 can connect the call to proceed in a normal manner. If the user of the mobile device does not answer the call, however, the mobile device controller 18, being outside of the mobile device can determine that the call has not been answered and the ring back can be continually played to the caller. Additionally, the mobile device controller 18 can eventually release the communication back to the PBX system 12 to implement appropriate call handling by the PBX system, such as if the communication originated with the PBX system 12. As an alternative example, when the call did not originate in the PBX system 12, the mobile device controller 18 can signal the PBX system 12 (e.g., via signaling in a diversion header of SIP) to send the communication to the PBX system for processing the call. For example, the PBX system 12 can process the unanswered call according to call handling configuration that has been established for the enterprise identity, which can include sending the call to enterprise voicemail 30 of the PBX system 12. The enterprise voicemail 30 can be local to the PBX or it can be a hosted system. For each answered or unanswered call to the enterprise entity of the mobile device 20, the mobile device controller and/or the PBX system can store information about the communication in memory. The information can include call history information and further can include a field for tagging the missed communication and voicemail, if a message is left, as an enterprise or business identity. For example, the call can be identified in call history as a missed call for the mobile device 20 that is flagged by including a business tag in the call history data to differentiate it from a personal call provided to the mobile device via the mobile network 14.

The mobile device controller 18 can also implement call handling for inbound calls to the mobile device provided via the mobile network 14. For example, the mobile network 14 can provide call information to the mobile device controller 18, which can in turn offer the call communication to the mobile device 20 in a normal manner such that the communication, having the personal identity for the mobile device, can proceed accordingly. For instance, if a user of the mobile device answers a call for the personal identity the call can proceed in a normal manner. If the user does not answer the call, the call can be routed to the voicemail (e.g., cellular voicemail) 32 associated with the mobile network 14. The mobile device controller 18 further can record call data and call history memory and tag the call information as having the personal identity to enable the user to ascertain which identity such call relates.

The mobile device controller 18 can be programmed to aggregate message waiting information from voicemail systems 30 and 32 from each of the PBX system 12 and the mobile network 14. The mobile device controller 18 further can apply corresponding identity tags to specify whether a recorded message has a business identity, a personal identity or other identity. The mobile device controller 18 further can provide the mobile device 20 with message waiting indicator data. The message indicator data, which can be stored locally by the mobile device 20 and further can be updated in real time by the mobile device controller 18. The message indicator data can enable a user of the mobile device to differentiate (e.g., graphically and/or textually on a graphical user interface) between voicemail messages that have been recorded for each respective identity. The message waiting indicator data can thus be utilized to inform a user of a recorded message and to which identity the message belongs, such as may be implemented by voicemail control running on the mobile device 20. The message itself further can be stored locally on the mobile device or be accessed in response to user input to retrieve the message from the respective voicemail 30 and 32. When a user seeks to retrieve a given message, such as in response to selecting a given message, the tagged identity data can also be utilized by the mobile device controller 18 to communicate a request to the appropriate mailbox 30 or 32, for example.

As a further example, the mobile device controller 18 can be configured to determine an identity that is to be associated with the outbound communication from the mobile device 20. For instance, the mobile device controller 18 can evaluate call criteria and context information associated with each outbound communication from the mobile device 20. The call criteria and context information can include, for example, a telephone number for the recipient of the communication, a time of day when the communication is initiated, the location of the mobile device 20 when the communication is initiated. The mobile device controller 18 can implement logic to compare information in an address book and/or call history information with the call criteria and context information derived from the outbound communication. As disclosed herein, information in an address book and/or call history information can include tags specifying telephone numbers as enterprise/business numbers or personal numbers. The mobile device controller 18 thus can use such information for determining the identity that is assigned for a given outbound communication.

As an example, if the mobile device controller 18 determines that the identity for the mobile device 20 for a given outbound communication should be its enterprise identity, the mobile device controller can direct the call to a mobile device proxy for the mobile device that is resident in the PBX system 12. The PBX system 12 can in turn insert the enterprise caller ID and send the call to the recipient through the PSTN or within the private network depending upon the party being called. As another example, the mobile device controller 18 can substitute the enterprise identity (e.g., caller ID) into the outbound communication and then direct the communication to the recipient, such as via the mobile network 14, to the PBX system 12 or directly to the PSTN if a connection exists. If the mobile device controller 18 determines that the user's personal identity associated with the mobile network is to be utilized for the outbound communication, the mobile device controller can direct the communication to the mobile network 14 via the link 26 for sending to the recipient of the communication with the personal identity.

In each of the outbound and inbound communication scenarios, the mobile device controller 18 can record pertinent communication information (e.g., called number, time and identity of the mobile device), which can be stored in memory as call history information for such communication. Additionally or alternatively, the call history information for both inbound and outbound calls can be stored in local non-volatile memory of the mobile device 20, including the identity tag, such as to enable a user to differentiate between whether the call was a business call or a personal call.

Figure 2:
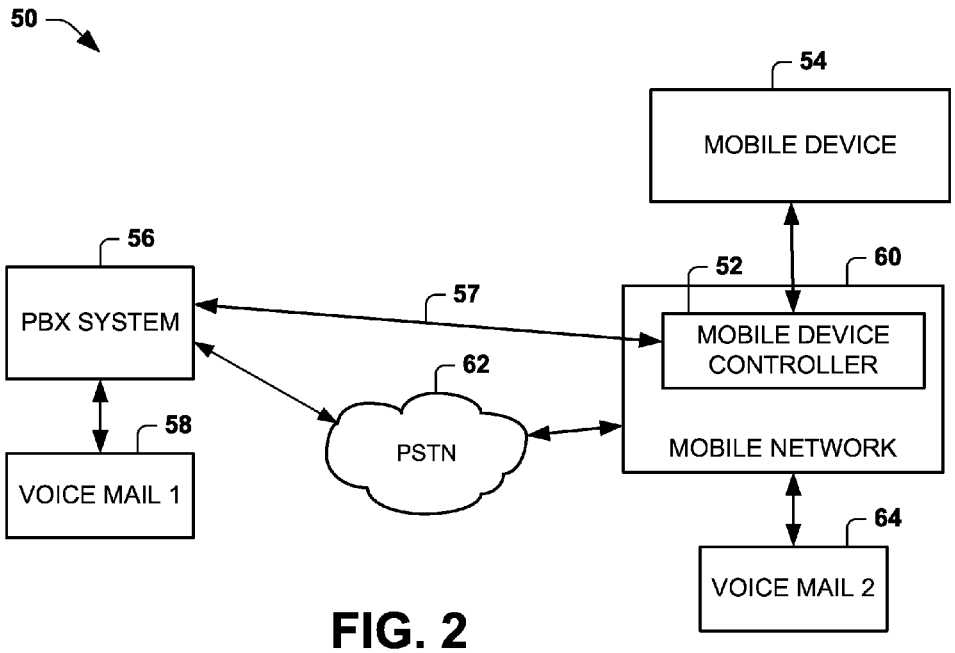
FIG. 2 depicts another example of a communication system configured to control multiple identities for a mobile device.

FIG. 2 depicts another example of a communication system 50 that can implement a mobile device controller 52 for controlling an identity of a mobile device 54 for communication and routing control in the system 50. The system 50 is similar to the system of FIG. 1 and includes a PBX system 56 that can include one or more voicemail boxes for each of a plurality of users. The mobile device 54 can be registered and authenticated for operation in a private network corresponding to the PBX system 56. The system 50 can also include a mobile network 60 in which the mobile device 54 is also configured for operation according to one or more wireless communication technologies.

In the example of FIG. 2, the mobile device controller 52 resides within and is integrated into the mobile network 60 such as being implemented by a corresponding service provider that maintains and operates the mobile network 60. Thus, the communications link 26 and signaling between the mobile device controller and mobile network 14 of FIG. 1 has been eliminated, such that the mobile device controller 52 can operate as an integrated part (e.g., as executable instructions) of the mobile network 60. The PBX system 56 still can include an API that can be utilized to access the functions and methods corresponding to the mobile device controller 52, such as can be provided over a secure tunnel or other communications link, demonstrated at 57. It is to be understood that the PBX system 56 can include a respective API for accessing the mobile device controller for any number of one or more mobile networks, each of which mobile networks can include any number of mobile devices 54. The system 50 can also include a PSTN 62 to which each of the PBX system 56 and mobile network 60 can communicate, such as disclosed herein.

As a further example, the integration device 308 of the above-incorporated U.S. application Ser. No. 12/778,648 comprises mobile device controller 52. Thus, in such examples the mobile device controller 52 can be configured to perform any and all functionality of the integration device 308 as set forth in the above-incorporated patent.

By way of example, the PBX system 56 can be configured to access the mobile device controller 52 for each of a plurality of different mobile networks, such that use of the system 50 is not limited to a given service provider. As a result, the system 50 can enable users to implement different mobile devices in BYOD paradigm. The mobile device controller 52 can be programmed to perform functions related to determining an identity of and control routing for each communication, as disclosed herein with respect to FIGS. 1 and 4 and according to the methods of FIGS. 7 and 8. Similar to the example of FIG. 1, in the example of FIG. 2, the mobile device 54 thus can include a voice mailbox 58 residing within the PBX system 56 (for recording business communications) as well as another voice mailbox 64 residing within the mobile network 60 (for personal communications).

Similar to as in the example of FIG. 1, the mobile device controller 52 can be programmed to aggregate message waiting information from voicemail systems 58 and 64 from each of the PBX system 56 and the mobile network 60. The mobile device controller 52 further can apply corresponding identity tags to specify whether a recorded message has a business identity or a personal identity. The mobile device controller 52 further can provide the mobile device 54 with message waiting indicator data, which can be stored locally in the mobile device. The message waiting indicator data thus can be utilized to inform a user of a recorded message, which can be accessed at the mobile device, such as disclosed herein.

Figure 3:
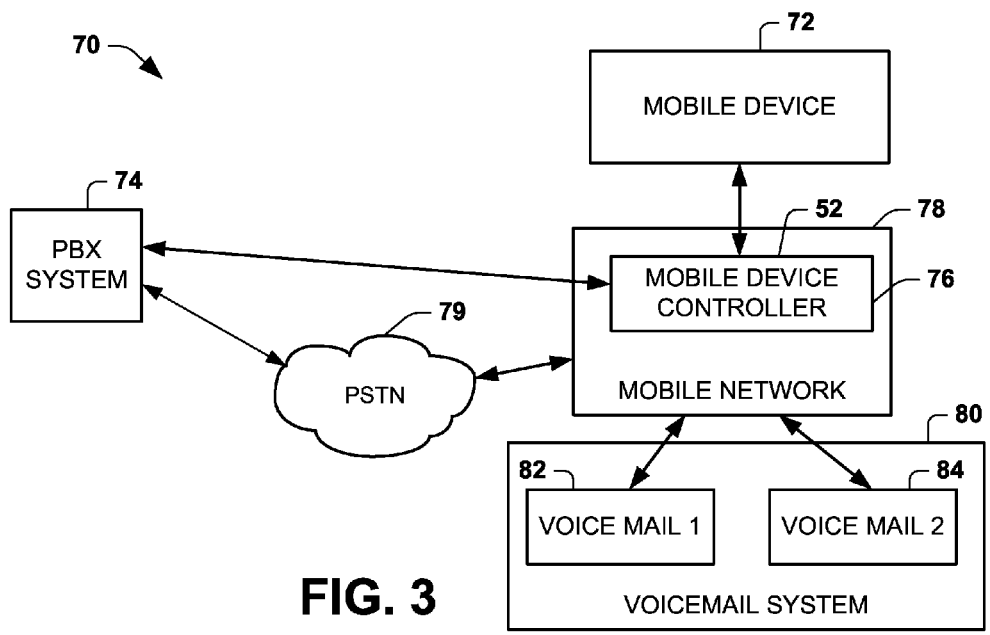
FIG. 3 depicts yet another example of a communication system configured to control multiple identities for a mobile device.

FIG. 3 depicts yet another example of a communication system 70 that can implement multiple identities for a mobile device 72. The example system 70 of FIG. 3 is similar to the communication system 50 disclosed with respect to FIG. 2. Briefly stated, the system 70 includes a PBX system 74 that can include any number of devices (e.g., devices 17 of FIG. 1) within the private network. The PBX system 74 is programmed for routing communications to each of any number of such devices according to the call handling criteria and policies that have been established. The system 70 also includes a mobile network 76 that includes an integrated mobile device controller 78. For example, the PBX system 74 can communicate with the mobile device controller such as disclosed herein (e.g., via a corresponding API implemented at the PBX system). The API can be utilized for communicating with the mobile device controller such as via wireless communication link or a wire communication link such as via the PSTN 79.

As disclosed herein, the mobile device controller residing within the mobile network enables call control functionality and identity consolidation functions to be implemented with respect to the mobile device 72. The mobile device controller 78 can be implemented according to the examples disclosed herein, such as with respect to the example of FIG. 1 and the examples of FIGS. 4, 7 and 8. In the example of FIG. 3, the mobile network 76 includes a voicemail system 80 which can include a voicemail box for each of two or more distinct identities of the mobile device 72. For example, the voicemail system 80 can include a voicemail inbox repository 82 for storing voicemail for calls for the enterprise identity of the mobile device and another separate repository 84 for storing voicemail communication for the personal identity or identity of the mobile device within the mobile network 76. Thus, in the example of FIG. 3, the voicemail for the PBX can be a hosted voicemail controlled by the mobile network operator. In some examples, a copy of the voicemail data 82 for the enterprise identity can be stored in the PBX system 74.

In addition to maintaining a separate repository for voicemail for each of the identities of the mobile device 72, a single voicemail box 82 can be utilized to store voicemail messages for two or more different identities of the mobile device. For example, the single voicemail box can include metadata associated with each voicemail message to tag an identity for the message (e.g., a business identity, a personal identify or other identity).

Additionally, the mobile device controller 78 can store call history and contact information for the mobile device in which business and personal contacts and calls are differentiated by the tagging the respective contacts and calls with data distinguishing between the identity for the mobile device 72. Additionally, since in this example the voicemail repositories 82 and 84 are maintained by the mobile network, the mobile device controller can retrieve messages from either mailbox on behalf of a user of the mobile device, regardless of whether the request is initiated by a communication from the mobile device or from the PBX system 74.

Figures 4, 5:
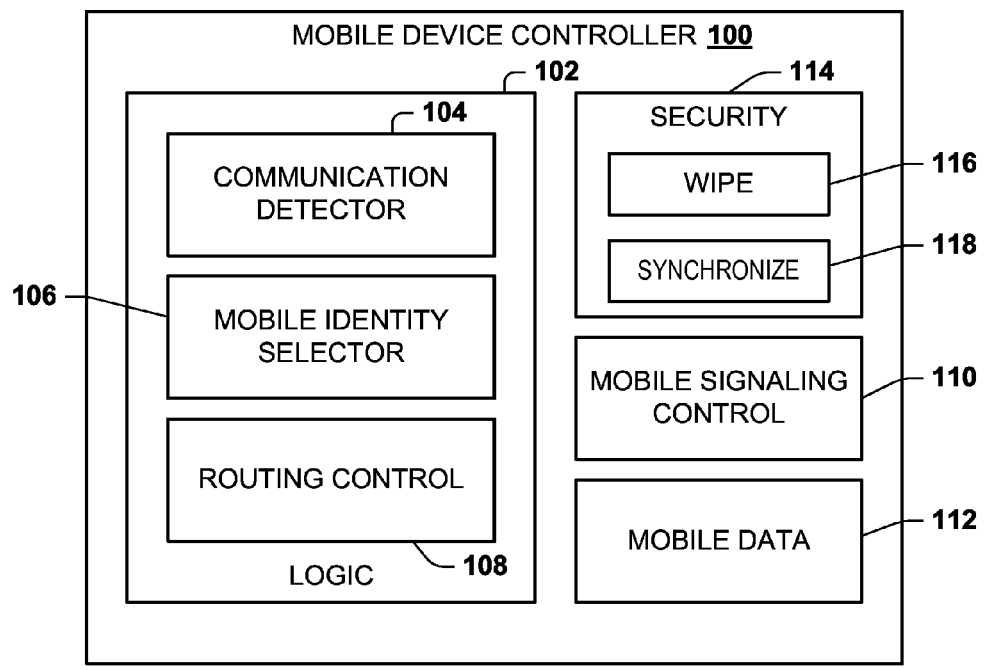
FIG. 4 depicts an example of a mobile device controller.
FIG. 5 depicts an example of a mobile device.

FIG. 4 depicts an example of a mobile device controller 100. The mobile device controller 100 can correspond to the mobile device controller 18, 52 or 78 disclosed with respect to FIGS. 1-3. The mobile device controller 100 can be implemented as machine readable instructions that can be stored in one or more non-transitory computer readable media. The instructions can be accessed by a processing resource (e.g., one or more processing cores) and executed to perform the functions disclosed herein.

In the example of FIG. 4, the mobile device controller 100 includes logic 102 that is programmed to perform the functions and methods that include a communication detector 104, a mobile identity selector 106 and routing control 108. The logic 102 thus can manage and control an identity for the mobile device for inbound communications, outbound communications or both. It is to be understood that the mobile device controller 100 can be configured to operate with respect to any number of one or more mobile devices. Such mobile devices can operate within one or more different service providers, such as disclosed with respect to the examples of FIGS. 1-3.

The communication detector 104 can be programmed to detect communication that is being sent to or initiated from a mobile device that operates with multiple identities (e.g., business and personal identities). As disclosed herein, the mobile device is configured to operate with a given identity (e.g., a personal identity) in a corresponding mobile network in which a mobile device has been authenticated. The mobile device is also configured to operate with a second identity, such as in a private network such as associated with a PBX system as disclosed herein. The second identity can correspond to an enterprise phone number or other communication address that may be associated with the mobile device. Additionally, even though a given identity of the mobile device may be associated with a particular network, in some examples, the mobile controller can use an identity for the mobile device that is different from the network through which the communication is provided. The communication detector 104 thus can detect communications to and from the mobile device by operating as an interface between the mobile network and the mobile device and in some examples between the PBX system and the mobile device in other examples.

The mobile identity selector 106 can be programmed to determine which identity of the mobile device to employ for the mobile device in response to the communication detector 104 detecting a communication. The mobile identity selector 106 can determine the identity for the given communication based on information that is associated with the communication. As an example, the information associated with the communication can include a calling party for an outgoing communication (e.g., telephone number), which can be compared relative to data 112 that may be stored in an address book, call history or other look-up table. For an incoming call, the mobile identity selector 106 can ascertain the source of the communication, such as whether it had originated from a PBX system such that the communication is a business communication for which a business identity is to be utilized. For an inbound call to the mobile device being provided from the mobile network, the mobility identity selector 106 can determine that the personal identity of the mobile device is to be utilized. In other examples, the mobile identity selector 106 can compare the originator's identity, as specified in signaling for the communication relative to data 112 that may be stored in an address book, call history or other look-up table accessible by the logic 102. Additionally or alternatively, the mobile identity selector 106 can employ predetermined rules to determine the identity of the mobile device for a communication, which can be based on time of day, a location of the mobile device or in response to a user input (e.g., a manual override) specifying an identity for the mobile device.

The routing control 108 can be configured to direct the communication to an appropriate destination port such as by sending it to the mobile device for inbound calls or sending it to one of the PBX system, PSTN or mobile network for an outbound call based on the identity determined by the mobility identity selector 106. In some examples, least cost routing rules further can be utilized by the routing control to determine to where the outbound communication is to be sent.

The mobile device controller 100 further can include mobile signaling control 110 to signal the recipient of the communication about the identity of the call. The signaling control 110 can implement signaling to a recipient via in-band signaling within the communication that is being transferred. In other examples, the mobile signaling control 110 can provide out-of-band signaling to the recipient to identify the identity of the mobile device for the communication. The mobile signaling control can be utilized for signaling the mobile device for an inbound communication. The mobile signaling control can be utilized for signaling a PBX system or mobile network for an outbound communication.

As a further example, the mobile data 112 can include call history or contact information that includes a list of contacts associated with the mobile device and further includes an indication whether each contact or each identity for a contact (e.g., if there are more than one) is assigned to a given entity of the mobile device. For example, a given contact can include multiple phone numbers one or more which may be personal and another which may be business contact information. Accordingly, the mobile identity selector 106 can determine the separate identity of the communication based on an evaluation of the calling party or called party with respect to the identity data that has been tagged in the mobile data 112.

The mobile device controller 100 can also include a security module 114 that can be utilized to control access to data associated with one or more of the mobile device's identities. This can be implemented, for example, to maintain control of data that is owned by an entity (e.g., a business entity), such according to an employment contract or other form of agreement between the entity and the user of the mobile device. The security module 114 can be utilized to control records (e.g., for contacts, call history and other communications) that have been tagged as being associated with a particular identity of one or more mobile devices, such as disclosed herein. Additionally or alternatively, records (e.g., contacts) can be tagged as belonging to an enterprise entity apart from whether it has been or has not been tagged with an identity of any mobile device. For example, customer contacts can be stored into a contact list of one or more mobile devices and be tagged as being associated with a business enterprise (e.g., each user's employer). Such tagged contact records thus can correspond to enterprise controlled contacts, which can be used at each mobile device while a relationship (e.g., an employment relationship) exists between the user of the mobile device and the business enterprise.

The security module 114 can include a wipe function 116 programmed to delete all records from given mobile device that have been tagged to include a particular identity in response to a user input from one or more authorized persons (e.g., an administrator). The records being wiped can include records that have been tagged with the particular identity in response to inbound and outbound communications relative to the mobile device. Such records being wiped can also include any other record that may have been tagged (e.g., enterprise controlled contacts) with such particular identity.

For example, an administrator or other authorized user within the PBX can employ a secure portal to access the security module 114 and activate the wipe function for a specified mobile device. The wipe function can send a command (e.g., via signaling control 110) to the mobile device to delete each record tagged as business, such as including contacts, call history and SMS messages. However, information that is not tagged with any identity or has been tagged as personal will remain unaffected in the mobile device. This allows a business owner greater control over contacts that exist on a BYOD mobile phone that an employee (or former employee) might use for both business and personal reasons. Additionally, it also enables business records to be deleted by an authorized person in a similar manner in the event that a user reports a mobile device as lost or for other reasons. The wipe function 116 can be employed to delete some or all of the business records that have been tagged. For instance, if an employee changes positions with an enterprise, an authorized user can delete only those enterprise controlled contacts that are considered not relevant to the user's new position while retaining all personal and non-tagged contacts as well as a selected subset of the enterprise controlled contacts.

The security module 114 can also include a synchronize function 118 that can be utilized to add records from the mobile data to a mobile device in response to a user input from one or more authorized persons (e.g., an administrator). For example, the records can include a predetermined set of contacts frequently utilized within an enterprise or a logical group within an enterprise (e.g., a set of relevant customer contacts and/or internal company phone numbers). In another example, the records can be a set of records that are associated with a given enterprise entity (e.g., enterprise controlled contacts). For instance, if a given user of the mobile device gets a new mobile telephone or switches phones for some other reason, the synchronize function 118 can be utilized to re-synchronize the set of records for such given user from the mobile data 112 to the new mobile device. Additionally, the synchronize function 118 can be utilized to selectively add enterprise controlled contacts that might be deemed relevant to a given user, such as based on a user's current employment position in the enterprise or a location of the user, for example.

FIG. 5 depicts an example of a mobile device 120 that can operate with multiple identities for communication of voice and/or data. The mobile device 120 can be implemented in a communication system such as disclosed with respect to FIGS. 1, 2, and 3. The mobile device 120 can be a conventional mobile phone that is configured to operate in the mobile network to allow users to carry on phone calls and other types of communication (e.g., SMS messaging) with other devices (e.g., a land line phone, another mobile phone, an IP phone, a softphone or the like). The mobile device 120 includes a processor 122 and memory 124 that stores software and routines for performing various communication functions. The processor 122 thus can access the instructions in the memory and execute them. The mobile device 120 can also include one or more radio systems 126 for wirelessly transmitting and receiving voice and/or data with respect to one or more communication networks. The use and activation of the mobile device 120 can be controlled by a user via a user interface 128, which can include a keypad, keyboard, touch screen, buttons or switches and the like. For example, the mobile device 120 can be a digital mobile phone or an analog mobile phone. The mobile device 120 can also store software and routines that can be executed by the processor 122 to enable the mobile phone 108 to browse a network such as the Internet.

As a further example, the memory 124 can store communication control methods 130 to enable the mobile device 120 to communicate using one or more networks. The communication control methods 130 can also include a mobile device controller (MDC) API 132 that allows the mobile phone 108 to communicate with a mobile device controller as disclosed herein. Since the MDC API 132 is implemented within the call control of the mobile device and not as an application running as a separate process, the identity management and control can operate seamlessly to the user.

Figure 6:
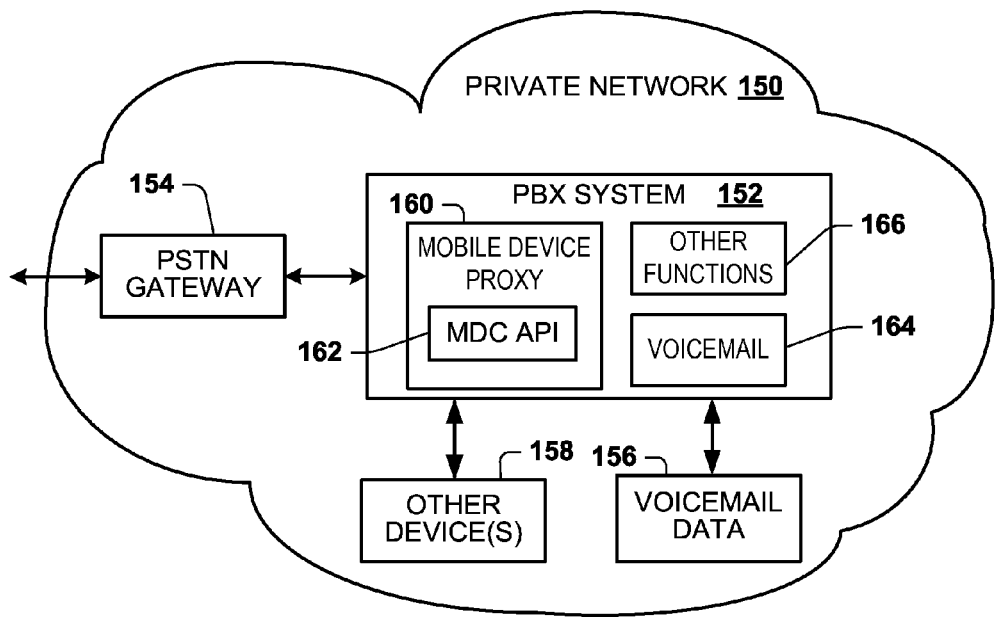
FIG. 6 depicts an example of a private network to which a mobile device can be registered.

FIG. 6 depicts an example of a private network 150 that can be implemented in a communication system, such as disclosed with respect to FIGS. 1, 2, and 3. The private network 150 includes a PBX system 152. The PBX system 152 can communicate to a PSTN via a PSTN gateway 154. The PBX system 150 can be utilized to implement PBX functionality with respect to communications routed through the PSTN gateway 154 or another communication interface (not shown). For example, the PBX system 152 can be implemented as an IP PBX that can utilize an IP protocol for communication sessions within the private network 150.

As an example, the PBX system 152 can include a voicemail system 164 configured to provide voicemail service for the PBX system as part of the PBX functionality, such as corresponding to an enterprise voicemail system. Audio voicemail messages and associated metadata describing related call information and message context can be stored as voicemail data 156 for one or for each of a plurality of enterprise users. For example, a voice mailbox may be associated with each user account that may have been established and associated with a given phone number. A user may have one or more phone numbers within the private network. In other examples, the voicemail system 164 can provide access to one or more voicemail box that is hosted in another network. For instance, the voicemail system 164 can be configured to access a converged voicemail system such as may reside and may be implemented in a mobile network (e.g., disclosed with respect to the example of FIG. 3). Any number of one or more other devices 158 can also be connected to the PBX system 152 such as can correspond to services, phone devices (e.g., IP phones, smart phones, or the like).

In the example of FIG. 6, the PBX system 152 includes a mobile device proxy 160 that can be utilized as a proxy for a given one or more mobile devices. For example, the mobile device controller, in response to determining an outbound call is to have an enterprise identity, can send the outbound call to the mobile device proxy 160. The mobile device controller can employ appropriate signaling to send the outbound call through the mobile network in some examples or through another network in other examples. The mobile device proxy can in turn complete call (or other communication) using the enterprise identity of the mobile device. For instance, the mobile device proxy 160 can direct the call through the PBX system to another device 158 that is part of the private network. As another example, the mobile device proxy 160 can direct the call through the PBX system and though the PSTN gateway 154 to another recipient of the communication that is external to the private network 150. The communication that is sent by the PBX system 150 can include the enterprise identity of the mobile device, such as the caller identification (e.g., a number and/or a name) for the mobile device's enterprise identity. The caller identification for the enterprise identity thus can be carried on primary rate interface access trunks and across the PSTN.

As another example, the mobile device proxy 160 can also employ a mobile device controller (MDC) API 162. The MDC API 162 can be utilized to access functions and methods associated with the mobile device controller (e.g., device controller 100 of FIG. 4). For example, the MDC API can be utilized by the PBX system 150 for signaling and routing inbound calls to the mobile device via the mobile device controller.

Figure 7:
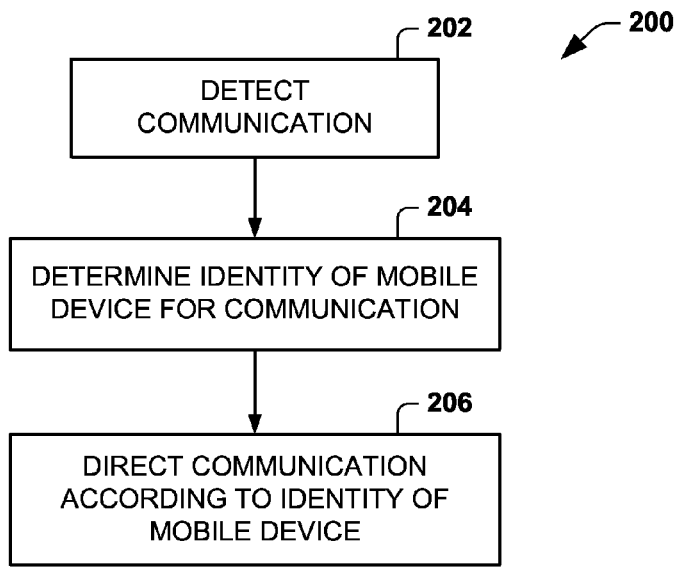
FIG. 7 is a flow diagram depicting an example method.

FIG. 7 depicts an example of a method 200 that can be implemented by a mobile device controller. At 202, the method includes detecting communication (e.g., by communication detector 104 of FIG. 4). The communication can be an inbound communication or outbound communication with respect to a mobile device. At 204, an identity of the mobile device for the detected communication can be determined (e.g., by mobile identity selector 106 of FIG. 4). At any given number of two or more identities for the mobile device which can be determined based on policies that have been established as well as information associated with the communication. At 206, the communication can be directed (e.g., by routing control 108 of FIG. 4) from the mobile device controller according to the identity of the mobile device and the direction of the communication (e.g., inbound or outbound) relative to the mobile device.

Figure 8:
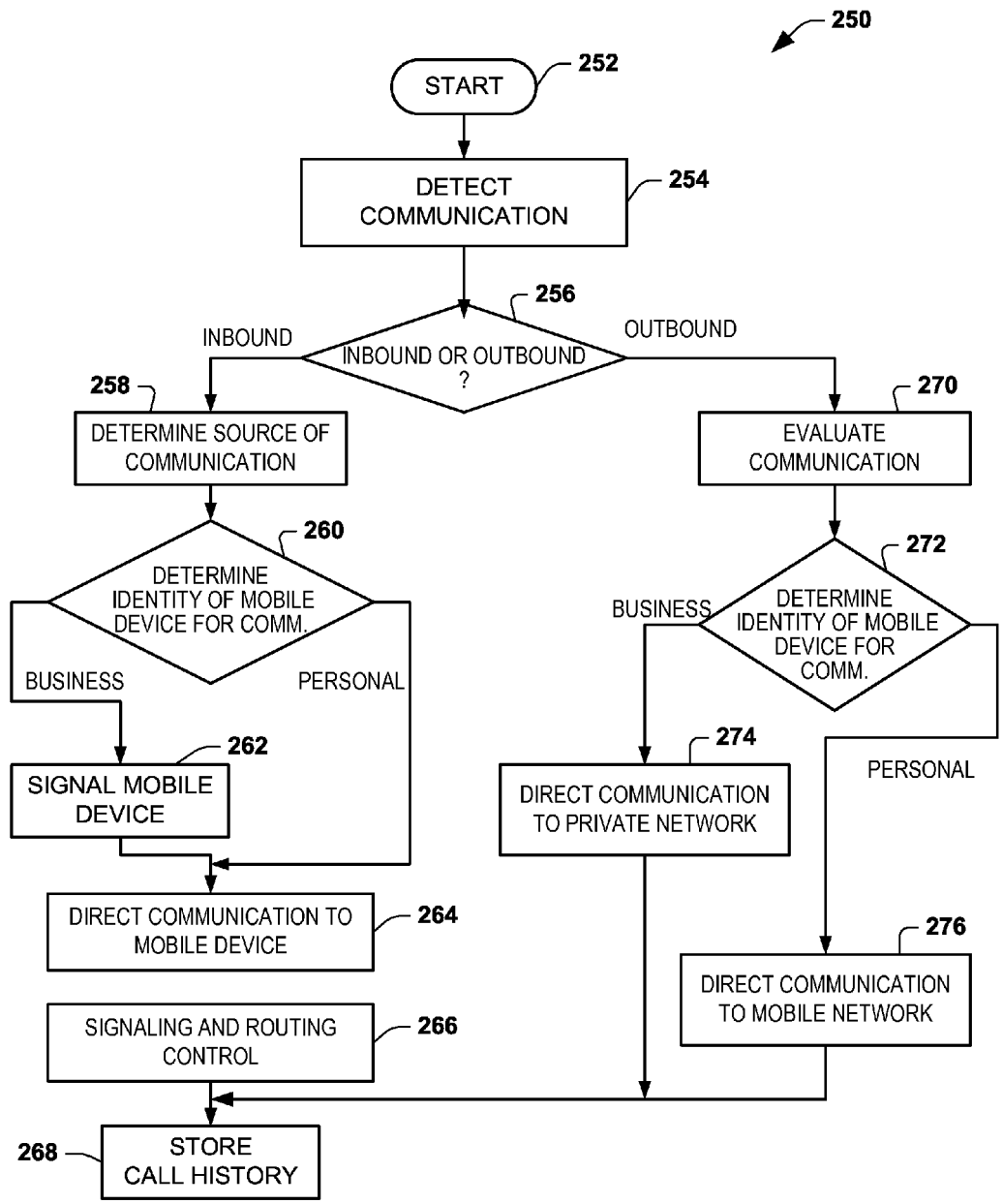
FIG. 8 is a flow diagram depicting another example method for controlling communications for a mobile device having multiple identities.

FIG. 8 depicts an example of a method 250. The method begins at 252 such as in conjunction with a mobile device being configured to operate within a mobile network according to a first entity and it being registered for operation within a private network, such as for a PBX system of an enterprise. At 254, a communication can be detected e.g., by communication detector 104 of FIG. 4), which can be intended for a mobile device initiated by a mobile device for another recipient. At 256, a determination is made as to whether the detected communication is an inbound or outbound communication. For an inbound communication the method proceeds to 258 in which a source of the communication can be determined. The source of the communication, for example can refer not to the initial sender but to the network from which the mobile device controller implementing the method 250 receives the communication (e.g., from the private network especially with a PBX system or from a mobile network). As an example, the determination at 258 can be made based on a caller ID of a communication that is provided from the manner applied to the PBX.

At 260, the identity of the mobile device for the communication is determined (e.g., by mobile identity selector 106 of FIG. 4). In the example of FIG. 8, the identity is selected between a first (e.g., business) identity and a second (e.g., personal) identity. In other examples, more than two different identities can be utilized, which may be registered for operation in one or more separate networks. With the identities determined to be the first identity (FIRST ID), for example, the method can proceed to 262 and the mobile device can be signaled of the inbound communication. As disclosed herein, the signaling can be implemented (e.g., by mobile signaling control 110 of FIG. 4) via in-band or out-of-band signaling. Additionally, if the identity of the mobile device is determined to be the second identity (e.g., SECOND ID) at 260 the method can proceed to 262 to signal the mobile device of the inbound call for the second identity.

From 262 the method can proceed to 264. At 264, the communication can be directed (e.g., by routing control 108 of logic 102 of FIG. 4) to the mobile device for delivery. The communication can be an SMS message, for example. In other examples, the communication can be a telephone call in which the communication can be answered or not answered by the mobile device. If the inbound call is not answered, the method can proceed to 266 in which the mobile device controller can perform signaling to send the communication to the appropriate voicemail system. In some examples, no explicit action may be required and 266 can be omitted by the mobile device controller. For instance, a PBX can send the call to voicemail automatically if there is no answered after some pre-determined amount of time.

As disclosed herein, the mobile device controller can signal the PBX system (e.g., via mobile device proxy 160) to connect the call to a private voice mailbox associated with the mailbox or, in other examples, enable the mobile network to send the call to the voice mailbox associated with the mobile device. At 268 details associated with the call, including the identity associated with the communication, can be stored in memory as call history data.

If, back at 256, the communication is determined to be an outbound communication, the method can proceed to 270 for evaluation (e.g., routing control 108 of logic 102). The evaluation can include a comparison of the called number identified in the outgoing communication relative to a phone book stored in memory for the mobile device. Other circumstances associated with the communication can be ascertained as part of the evaluation at 270. At 272, a determination of the identity of the mobile device for the communication can be made (e.g., by mobile identity selector 106). If the communication is determined to be associated with the first identity (e.g., an enterprise communication), the method can proceed to 274 in which the communication can be directed to the first network. For example, a mobile device controller can direct the communication to a mobile device proxy (e.g., mobile device proxy 160) operating in a private network for completing the communication to the recipient using the first (e.g., business) identity of the mobile device. If the communication is determined to be associated with the second identity at 272, the method can proceed at 276 for directing the communication to the second network (e.g., a mobile network) for routing to the specified recipient of the communication. The communication via the mobile network at 276 can include the second identity of the mobile device. From 274 and 276 the method can proceed to 268 and the appropriate information associated with the communication can be stored in memory as call history data. It is to be understood that in some examples the first and second networks can be different, and in other examples they can be the same network but support multiple identities for a given mobile device.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A mobile device controller operating in a communication system, the mobile device controller comprising:
    a communication detector configured to detect a communication to or from each of a plurality of mobile devices, each of the mobile devices being configured to operate in at least a respective mobile network and a private enterprise network, each mobile device having a personal identity assigned by its respective mobile network and an enterprise identity assigned by its respective enterprise network;
    memory configured store mobile data representing at least one of contacts, communication history and messages for each of the plurality of mobile devices;
    a mobile identity selector configured to determine which of the personal identity or the enterprise identity of each of the plurality of mobile devices to use for each communication detected by the communication detector based on information associated with each detected communication;
    logic configured to tag the mobile data for a given communication as personal mobile data associated with a given mobile device of the plurality of mobile devices in response to the mobile identity selector determining to use the personal identity of the given mobile device for the given communication and configured to tag the mobile data for the given communication as enterprise mobile data in response to the mobile identity selector determining to use the enterprise identity of the given mobile device for the given communication; and a security module configured to enable access by an authorized enterprise user to records stored in each of the plurality of mobile devices associated with the enterprise identity, wherein in response to a user input by the authorized enterprise user, the security module to send a command to remove records that have been tagged with the enterprise identity from at least the given mobile device while leaving information that is not tagged with any identity or has been tagged with the personal identity to remain unaffected in each of the plurality of mobile devices.

2. The mobile device controller of claim 1, wherein the security module is further configured to control records in the mobile data that have been tagged with the enterprise identity.

3. The mobile device controller of claim 2, wherein the logic is further configured to tag records in the mobile data to define to enterprise controlled data, which includes mobile data that has been tagged with the enterprise identity by the mobile identity selector.

4. The mobile device controller of claim 3, wherein in response to receiving the user input by the authorized enterprise user, the security module is configured to delete from the memory of the given mobile device a selected portion of the enterprise controlled data while leaving in the given mobile device another portion of the enterprise controlled data and data that is tagged as assigned to the personal identity.

5. The mobile device controller of claim 3, wherein the security module is configured to delete all of the enterprise controlled data from the memory of the given mobile device in response to the user input by the authorized enterprise user.

6. The mobile device controller of claim 1, wherein the memory configured to store the mobile data is external to each of the plurality of mobile devices and controlled by one of the mobile network or the enterprise network.

7. The mobile device controller of claim 1, further comprising a synchronize function configured to add records to the memory of one or more of the plurality of mobile devices, the added records corresponding to enterprise controlled data that is tagged as being assigned to the enterprise identity.

8. The mobile device controller of claim 7, wherein the enterprise controlled data includes a selected set of contact records.

9. The mobile device controller of claim 1, wherein the mobile device controller operates separately from and outside of each of the plurality of mobile devices and outside of the enterprise network.

10. The mobile device controller of claim 1, wherein the mobile identity selector includes an override function to determine the identity in response to a user input specifying the identity for the given mobile device.

11. The mobile device controller of claim 1, further comprising a voicemail system configured to access a voicemail box for each of the plurality of mobile devices that is hosted in the mobile network if a voicemail message for a respective mobile device is tagged with the personal identity of the mobile device or to access another voicemail box for the mobile device that resides in the enterprise network if the voicemail message for the respective mobile device is tagged with the enterprise identity of the mobile device.

12. The mobile device controller of claim 1, further comprising a voicemail system configured to access a converged voicemail box associated with each of the plurality of mobile devices, the converged voicemail box stores voicemail messages for both the personal identity and the enterprise identity.

13. A method comprising:
   detecting, at a mobile device controller, communications to or from each of a plurality of mobile devices, each of the mobile devices being configured to operate in at least a mobile network and a private enterprise network, each of the mobile devices having a personal identity assigned by its respective mobile network and an enterprise identity assigned by its respective enterprise network;
   storing mobile data in memory, at a mobile device controller, to represent at least one of contacts, communication history and messages for each of the plurality of mobile devices;
   determining, at a mobile device controller, which of the personal identity or the enterprise identity to use for each detected communication based on information associated with the detected communication for each of the plurality of mobile devices; and
   tagging the mobile data for a given communication as personal mobile data associated with a given mobile device of the plurality of mobile devices in response to determining to use the personal identity of the given mobile device for the given communication and configured to tag the mobile data for a given communication as enterprise mobile data in response to determining to use the enterprise identity of the given mobile device for the given communication; and
   in response to a user input by an authorized enterprise user, sending a command from the mobile device controller to remove records that have been tagged with the enterprise identity from at least the given mobile device while leaving information that is not tagged with any identity or has been tagged with the personal identity to remain unaffected in each of the plurality of mobile devices.

14. The method of claim 13, further comprising adding records to the memory of one or more of plurality of mobile devices from the enterprise, wherein the mobile data that has been tagged with the enterprise identity and the records added to the memory corresponding to enterprise controlled data.

15. The method of claim 14, sending a command from the enterprise network to selectively delete a portion of the enterprise controlled data from the memory of the given mobile device while leaving in the memory of the given mobile device other data that has been tagged with the personal identity of the given mobile device.

16. The method of claim 14, sending a command from the enterprise network to delete all of the enterprise controlled data from the memory of one or more of plurality of mobile devices.

17. The method of claim 13, further comprising:
   accessing a voicemail box for a respective one of the plurality of mobile devices that is hosted in the mobile network to access a voicemail message for the mobile device that has been tagged with the personal identity of the respective mobile device, or
   accessing another voicemail box for the respective mobile device that resides in the enterprise network if the voicemail message for the respective mobile device is tagged with the enterprise identity of the respective mobile device.

18. The method of claim 13, further comprising accessing a converged voicemail box associated with a respective one of the plurality of mobile devices, the converged voicemail box stores voicemail messages for both the personal identity and the enterprise identity for the respective mobile device.

19. The method of claim 13, further comprising adding to memory of a respective one of the plurality of mobile devices data representing enterprise controlled contacts determined to be relevant to a given user of the respective mobile device and/or a current location of the respective mobile device.

* * * * *